Figure 1:
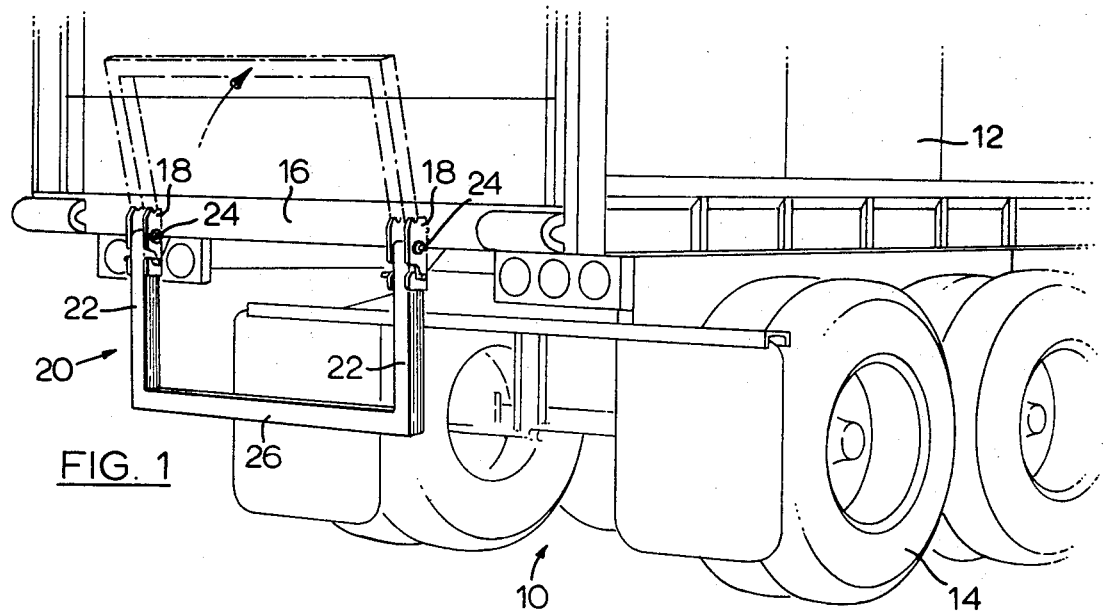

United States Patent [19]

Fehlau et al.

[11] 3,709,542
[45] Jan. 9, 1973

[54] TRAILER BUMPER

[75] Inventors: Bert H. Fehlau, Mississauga, Ontario; Garrit A. Domerchie, Toronto, Ontario, both of Canada

[73] Assignee: Highway Trailers of Canada Limited, Cooksville, Ontario, Canada

[22] Filed: Nov. 30, 1970

[21] Appl. No.: 93,631

[52] U.S. Cl. ................................................. 293/73
[51] Int. Cl. .............................................. B60r 19/04
[58] Field of Search ...... 293/63, 73, 80, 90; 248/240, 248/240.4, 242

[56] References Cited

UNITED STATES PATENTS 3,210,110  10/1965  Chieger ................................. 293/73
3,370,878  2/1968  Carr ..................................... 293/73 X

FOREIGN PATENTS OR APPLICATIONS 328,148  4/1930  Great Britain ..................... 248/240.4

Primary Examiner—Drayton E. Hoffman
Assistant Examiner—Robert Saifer
Attorney—Sim & McBurney

[57] ABSTRACT

A bumper for a trailer unit may be locked in alternative positions relative to a retaining bracket attached to the trailer unit. The two positions are respectively one in which the bumper projects below a horizontal plane including the point of attachment of the bracket to trailer unit and one in which the bumper projects above the horizontal plane.

8 Claims, 3 Drawing Figures

PATENTED JAN 9 1973

3,709,542

INVENTOR.
BERT N. FEHLAU
GARRIT A. DOMERCHIE
BY
Agent

TRAILER BUMPER

This invention relates to a bumper for a trailer.

Trailers which are hauled on the highway by an appropriate tractor are equipped with a rear wheel bogey. This bogey generally maintains the base of the trailer above the height of automobile hoods. To prevent motor vehicles from accidentally penetrating beneath the rear portion of the trailer body, a bumper is provided which projects downwardly from the rear of the trailer body.

On many trailers provision is made for adjustment of the relative positions of the bogey and the body of the trailer, and it may be desirable to remove entirely one bogey from the trailer and replace it with another bogey. The one bogey is removed via the rear of the body, and it is necessary that the bumper be removed from its normal downwardly projecting position to accomplish this.

This has previously been achieved by pivoting the ends of the bumper about brackets attached to a rear portion of the trailer body. To fix the bumper in the two positions, namely, the normal downwardly-projecting position and the upwardly-projecting position, wherein the bogey may be withdrawn via the rear of the vehicle, a complicated system of chains and pins commonly has been employed. This system is cumbersome to use and there is a tendency for the pins to be lost or the chains to break. Further, on some occasions, the bumper, upon being returned to the downwardly-projecting position after exchange of bogeys, will not properly lock with pins in this position, resulting in swinging of the bumper about the brackets during motion of the trailer.

The present invention provides, in combination, a retaining bracket and a bumper including an arm, in which the bumper may be self-locked in the aforesaid two positions, and which does not involve the use of chains or pins which may become broken or lost.

In the present invention, a projection is provided on one of the arm and bracket and recesses are formed in the other of the arm and bracket, which recesses receive the projection. The bumper is locked in the two positions by the location of the projection in the recesses and this location also inhibits pivotal movement of the arm relative to the bracket.

Figure 2:
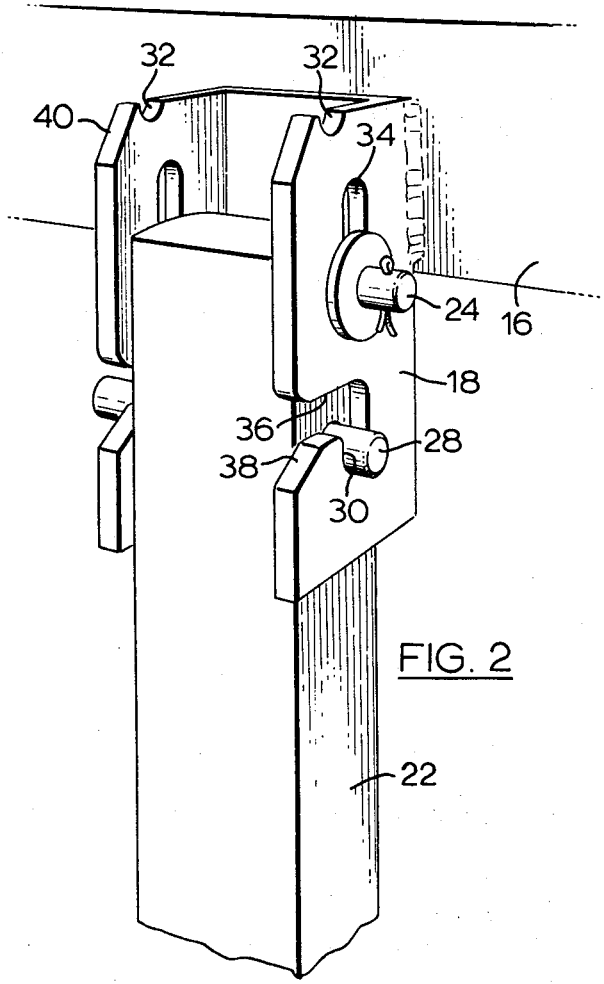
Figure 3:
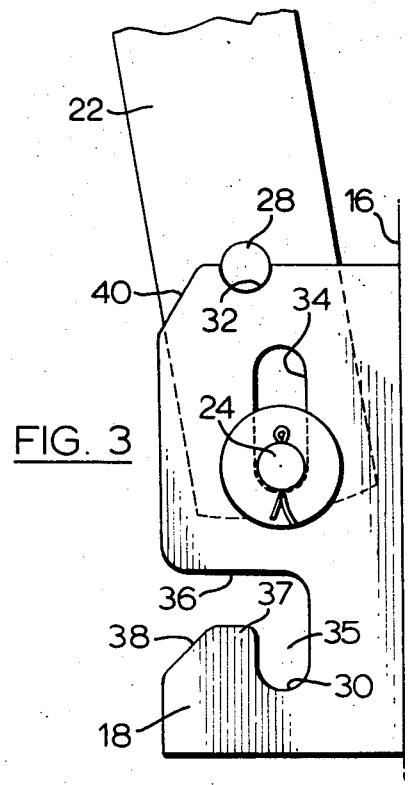

The invention is illustrated by the accompanying drawing, in which:

FIG. 1 is a perspective view of part of a trailer having a bumper according to the invention attached thereto, FIG. 2 is a perspective view of part of the bumper of FIG. 1 in one position, and FIG. 3 is a side-elevational view of part of the bumper of FIG. 1 in another position.

In the drawings, a trailer 10, only the rear part of which is shown, includes a body 12 and a bogey 14. The bogey 14 is attached to the body 12 in any convenient manner. The body 12 includes a rear sill 16 to which are affixed, typically by welding, two spaced apart retaining brackets 18.

A bumper 20 includes two arms 22 pivoted one to each of the brackets 18 by pivot pins 24 or other convenient means establishing a pivotal connection. A cross-piece 26 joins the arms 22 to form a generally U-shaped bumper. While the bumper 20 is illustrated as being U-shaped, any convenient shape of bumper may be employed. Additionally, two spaced apart brackets 18 with asssociated bumper arms are illustrated. This represents a preferred embodiment of the invention, but it is possible to provide a single bracket having the arm of single-arm bumper, typically a T-bar bumper, pivotally connected by suitable means to the bracket.

The bumper 20 may be moved from one position, shown in full outline in FIG. 1, in which it projects downwardly below the horizontal plane in which the sill 16 lies, to another position, shown in dotted outline in FIG. 1, in which the bumper 20 projects upwardly above that horizontal plane.

The bumper 20 is locked in the two positions and inhibited from pivotal movement about the pivot pin 24 when in the two positions in a particular manner, shown more particularly in FIGS. 2 and 3. Adjacent its pivoted end, each arm 22 is provided with pins 28 projecting from the side faces of the arm generally parallel to the pivot pin 24. The pins 28 may be provided by forming openings in the arms 22 and then passing a pin through the opening so that it projects on either side of the arms 22. The pin then is affixed by welding, or any other convenient manner.

The pins 28 may be replaced by any other convenient projection. Additionally, a single pin projecting only from one side face of the arm may be utilized, if desired.

Each arm of each bracket 18 is formed with recesses 30 and 32 therein, to receive the pins 28. Additionally, a longitudinal slot 34 is formed in each arm of each bracket to allow the pivot pin 24 to slide relative to the bracket 18.

The recesses 30 are in the form of elongated slots, having a portion 35 in vertical alignment with slots 34, and a throat portion 36 at right angles to the vertical portion. The throat portion 36 terminates at its inner end at a rounded shoulder 37 and at its outer end in a flared mouth including inclined bearing surfaces 38. Inclined bearing surfaces 40 are provided adjacent recesses 32. Recesses 32 take the form of part circular depressions which have a slightly larger radius of curvature than that of the pin 28.

While the recesses are illustrated as formed in the brackets 18 and the pins 28 which are received in the recesses are provided on the arms 22, it is possible to reverse this arrangement and provide the recesses in the arms 22 and the pins 28 on the brackets 18.

In the position shown in full outline in FIG. 1 and in FIG. 2, with the pins 28 in the vertical portion 35 of the recesses 30, the bumper is in a fixed position and the pins 28 are retained in the recesses 30 by gravity. The recesses 30 generally are formed with the vertical portion 35 deep enough so that the pins 28 do not jump out during up-and-down motion of the trailer. It will be seen that the bumper is inhibited from pivotal movement by the location of the pins 28 in the recesses 30.

In order to move the bumper to the dotted outline position of FIG. 1 and the position of FIG. 3, the bumper 20 is lifted and pivoted slightly, so that the pins 28 are removed from the vertical portion of the recesses 30. As the bumper is lifted, the pivot pins 24 rise in the slots 34.

Upon pivotal movement of the bumper 20 in a clockwise direction relative to the brackets 18 viewed in FIG. 1, the pin clears the throat portion of the recesses 30, and upon continued pivotal movement the pins 28 eventually strike and ride up the bearing surfaces 40, the pivot pin 24 sliding upwardly in the slots 34 during this motion. The pins 28 then drop into the recesses 32 and are held in the recesses 32 by gravity, thereby locking the bumper in the position shown in FIG. 3 and inhibiting pivotal movement of the bumper relative to the bracket. The pivot pin 24 returns to the bottom of the slots 34.

When the bumper has attained this latter position, the bogey 14 may be removed via the rear of the trailer and replaced by a different bogey.

To return the bumper 20 to the position of FIGS. 1 and 2, the bumper 20 is lifted, whereby the pins 28 are removed from the recesses 32 and the pivot pin 24 moves in the slots 34. The bumper then is allowed to pivot under the influence of gravity in an anticlockwise direction as viewed in FIG. 1 until the pins 28 engage and ride up bearing surfaces 38, thereby directing the pins into the throat portion 36, so that upon reaching the end of the shoulder 37, the pins 28 drop under the influence of gravity into the recesses 30 and the position shown in FIG. 2 is reestablished.

The form of the brackets, the projections and the recesses formed therein shown in the drawings represents a preferred embodiment of the invention. It is possible to provide other shapes of recess and alternative forms of bracket and projections which achieve a gravity lock in the two positions, and a gravity return from one to the other.

It will be seen that the present invention provides a bumper and bracket combination which is easy to use and does not involve the use of cumbersome items or the use of chains and loose pins.

Modifications are possible within the scope of the invention.

What we claim is:

1. In combination, at least one retaining bracket adapted to be attached to one portion of a trailer unit, a bumper including at least one arm projecting from said bracket, and means pivotally connecting said bracket and said arm, said arm being pivotable relative to said bracket between a first position wherein said bumper projects downwardly below a substantially horizontal plane in which said one portion of a trailer unit is located and a second position wherein said bumper projects upwardly above said horizontal plane, one of said arm and said bracket having a projection and the other of said arm and said bracket having recesses formed therein to receive said projection, said projection being received in one of said recesses when said arm is in said first position and being received in another of said recesses when said arm is in said second position, said projection when located in said recesses locking said bumper in said first and second positions and inhibiting pivoting of said arm relative to said bracket about said pivoting means, said bracket having spaced apart parallel walls between which are located one end of said arm, said projecting including pin like members projecting from opposite sides of said arm adjacent said one end thereof towards said walls, said one recess including a first portion extending longitudinally of each of said walls and a throat portion extending at substantially right angles to said first portion.

2. The combination of claim 1, wherein said other recesses include a depression formed in a peripheral portion of each of said walls on the opposite side of said means pivotally connecting said bracket and said arm from said one recess.

3. The combination of claim 2 wherein each of said walls has an elongated slot formed therein projecting in the longitudinal direction of the walls, and said means pivotally connecting said bracket and said arm includes a pivot pin carried by said arm received in the slots in said walls.

4. The combination of claim 1 wherein said throat portion is outwardly flared.

5. The combination of claim 1 wherein there are first and second ones of said brackets adapted to be attached to said one portion of a trailer unit and located in spaced apart relationship, said bumper including at least first and second ones of said arms projecting one from each of said first and second brackets.

6. The combination of claim 1 wherein said bumper includes a cross-piece joining said first and second arms.

7. The combination of claim 1 wherein said means pivotally connecting said bracket and said arm includes a pivot pin.

8. In combination, first and second retaining brackets adapted to be attached to one portion of a trailer unit and located in spaced apart relationship, said bumper including first and second arms projecting one from each of said first and second brackets and a cross piece joining said first and second arms, each of said brackets including two substantially parallel walls between which is located one end of one of said arms, each of said walls having an elongated slot extending longitudinally of said walls, and pivot pins camed by said arms pivotally connecting said brackets and said arms, one pivot pin being received in slidable relation in the elongated slots formed in the parallel walls of one of said brackets and another of said pivot pins being received in slidable relation in the elongated slots formed in the parallel walls of the other of said brackets, first and second projections on each of said arms, said projections projecting from opposite faces of said arms towards and at least as far as said parallel walls and being located adjacent said one end of each of said arms but further away from said one end than said pivot pins, first recesses formed in each of said walls including an elongated portion in vertical alignment with the slot and a throat portion extending from and at right angles to said elongated portion to a peripheral portion of said wall, said throat portion having an area flared towards said pheripheral portion, second recesses in each of said walls including a depression formed in a peripheral portion of said wall on the opposite side of the slot from said first recess, each of said walls including a sloped peripheral portion adjacent said other recess, said first and second projections on one of said arms being received one in each of the first recesses in the parallel walls of one of said brackets in a first position wherein said bumper projects downwardly below a substantially horizontal plane in which said one portion of a trailer unit is located and said first and second projections on said one of said arms being received one in each of the second recesses in the parallel walls of said one of said brackets in a position wherein said bumper projects upwardly above said horizontal plane, and said first and second projections on the other of said arms being received one in each of the first recesses in the parallel walls of the other of said brackets in said first position and said first and second projections on said other of said arms being received one in each of the second recesses in the parallel walls of said other of said brackets in said second position, said projections when located in said recesses locking said bumper in said first and second positions and inhibiting pivoting of said arms relative to said brackets about said pivot pins.

* * * * *